(12) United States Patent
Stephens et al.

(10) Patent No.: US 6,208,652 B1
(45) Date of Patent: Mar. 27, 2001

(54) INCREMENT SCHEDULER

(75) Inventors: Donpaul C. Stephens, Pittsburgh; Jon C. R. Bennett, Ambridge, both of PA (US)

(73) Assignee: Fore Systems, Inc., Warrendale, PA (US)

( * ) Notice: Subject to any disclaimer, the term of this patent is extended or adjusted under 35 U.S.C. 154(b) by 0 days.

(21) Appl. No.: 08/874,608

(22) Filed: Jun. 13, 1997

(51) Int. Cl.[7] .................................................. H04L 12/28
(52) U.S. Cl. ............................ 370/395; 370/235; 370/229
(58) Field of Search .................................... 370/229, 235, 370/230, 231, 395, 233, 234, 412, 396, 397, 398, 400, 236

(56) References Cited

U.S. PATENT DOCUMENTS

| | | | |
|---|---|---|---|
| 5,748,614 | * | 5/1998 | Wallmeier ............................ 370/235 |
| 5,859,835 | * | 6/1999 | Varma ................................. 370/229 |
| 6,041,059 | * | 3/2000 | Joffe .................................... 370/412 |

\* cited by examiner

Primary Examiner—Douglas W. Olms
Assistant Examiner—Ricardo M. Pizarro
(74) Attorney, Agent, or Firm—Ansel M. Schwartz

(57) ABSTRACT

A scheduler for a server for serving ATM cells. The scheduler includes R rate bins where R is greater than or equal to 2. The scheduler includes a controller which places a session having a desired rate into a rate bin of the R rate bins. A system for transmitting ATM cells. The system includes an ATM network along which ATM cells are transmitted. The system includes S sources where S is greater than or equal to 1 and is an integer. Each source is connected to the network and produces ATM cells for transmission on the network. The system includes D destinations where D is greater than or equal to 1 and is an integer. Each destination is connected to the network. Each destination receives ATM cells from the network. The system includes a server connected to the ATM network. Additionally, the system includes a scheduler which has R different rate bins for holding sessions, where R is an integer greater than or equal to 2. The scheduler schedules service by the server among the R different rate bins, with precision P, where P is an integer and the number of bits assigned for precision. The scheduler is connected to the server. A method for providing service by a server to sessions.

16 Claims, 7 Drawing Sheets

INCREMENT SCHEDULER

FIELD OF THE INVENTION

The present invention is related to a scheduler. More specifically, the present invention is related to a scheduler which is composed of a mechanism that selects among a small number of bins (which determines the range of supported rates) and a second mechanism which selects among the sessions within the bins (which determines the precision of supported rates).

BACKGROUND OF THE INVENTION

ATM (asynchronous transfer mode) is used for communications purposes in integrated services digital networks. Through these networks, ATM cells belonging to a multitude of sessions travel to their desired destinations. Due to the potential for sources to transmit more bandwidth to a link than it can sustain, a condition called congestion may occur. To protect sessions from transient overload or belligerent sources, schedulers are used on outgoing links in ATM switches.

Ideally, a scheduler should be able to service every session at its guaranteed rate provided that the sum of the rates guaranteed to the sessions does not exceed the available capacity of the link. To deliver a guaranteed service rate for a session, each session must have its cells identified and stored in a FIFO queue of cells for said session. Ideally, the sessions should receive smooth service. Furthermore, a scheduler must be efficient for either a hardware or a software implementation for high speed operation. In the past, schedulers either could not deliver guarantees, provided them in a rather bursty manner, and/or had high implementation complexity.

The present invention enables schedulers to be designed with low implementation complexity while providing smooth service while being able to support a very large number of rates.

Deficit Round Robin

One scheduler designed to provide fair service among variable sized packets [M. Shreedhar and G. Varghese. "Efficient fair queuing using deficit round robin", in Proc SIGCOMM'95. Boston, Mass., August 1995], uses a hashing function to assign sessions to buckets. The probability of collisions of multiple sources sharing a bucket eliminates the ability to provide guarantees, and is acknowledged to be "best suited for datagram networks." Simple round robin provides the same function in ATM networks. If a wide range of rates is desired, the fastest sessions will be serviced in large bursts as in weighted round robin.

Geometric Weighted Groups

One scheduler designed to perform rate control in ATM networks [D. Klausmeier. "Method and apparatus for performing communication rate control using geometric weighted groups." U.S. Pat. No. 5,561,663. Oct. 1, 1996], uses geometric weighted groups to organize sessions into multiple groups. The mechanism is described using a binary representation of the accumulation rate, where the rate of session i is represented as:

$$a_i = (a_{i0}x2^0) + (a_{i1}x2^1) + \ldots + (a_{i(m-1)}x2^{m-1})) = \sum_{j=0}^{m-1} a_{ij}x2^{0j}$$

wherein $a_{ij}=0$ or 1.

This uses m groups of sessions, with one group per corresponding $a_{ij}$. A session will be entered into every group for which its coefficient is a 1. A credit balance is maintained for each group equal to the number of entries in the group times the weight factor of its position. The weight factor for each session group j is $2j$ when the binary coefficients are used to define the groups. When a group is serviced, the first session on the group's list is served, and sent to the end of its linked list.

While this enables a wide range of rates to be represented with a small number of groups, it can exhibit bursty service, has high memory requirements, and is not ameable for operation as a work conserving scheduler. When a session is scheduled in many groups concurrently, the session may arrive to the head of many of these groups and be serviced from this multitude of groups in immediate succession. This may result in a cell being transmitted for this session in a burst of cells with length equal or greater than the number of bins the session is scheduled in.

Each session must allocate $PM=m \times \log_2 MaxConns$ bits of memory for maintaining its pointer memory. Where m is the number of groups, and MaxConns is the maximum number of supportable sessions. For a switch requiring 10 cells per second of granularity for an OC-3 link with support for 64 thousand sessions, 32 Bytes are required per session (2 MB of memory for all sessions) to maintain the pointers.

While memory population is an issue that may be addressed with the application of additional money in the form of memory chips, the described mechanism does not adequately address the needs of a work conserving scheduler. In work conserving operation, the scheduler must never stall when a cells exist in the memory awaiting service. A commonly used method of removing sessions from te scheduler when their queues are drained would be expensive to apply to this mechanism, because a session may be enqueued in multiple groups, and is not necessarily at the head of all but the group that served it. The linked lists that are maintained for the groups would have to be made into doubly linked lists to enable a session to be removed from all groups when it becomes idle. Similarly, a session would have to be inserted into every group for which it should be scheduled whenever a cell arrives into an empty queue. This dramatically increases the required memory references and doubles the required pointer memory space, which was already rather large.

One scheduler designed to be hardware efficient [J. L. Rexford, A. G. Greenberg, and F. G. Bonomi. "Hardware-Efficient Fair Queuing Architectures for High-Speed Networks" in Proc IEEE INFOCOM 1996], uses a hierarchical structure to efficiently schedule among sessions. A calendar queue is used to select among the sessions in the rate bins. Each calendar queue consists of multiple FIFOs of sessions, requiring pointer manipulations among the component queues in addition to operations within the FIFOs themselves to select a session for service.

SUMMARY OF THE INVENTION

The present invention pertains to a scheduler for a server for serving ATM cells. The scheduler comprises R rate bins where R is greater than or equal to 2. The scheduler comprises a controller which places a session having a desired rate into a rate bin of the R rate bins.

The present invention pertains to a system for transmitting ATM cells. The system comprises an ATM network along which ATM cells are transmitted. The system comprises S sources where S is greater than or equal to 1 and is an integer. Each source is connected to the network and produces ATM cells for transmission on the network. The system comprises D destinations where D is greater than or equal to 1 and is an integer. Each destination is connected to the network. Each destination receives ATM cells from the network. The system comprises a server connected to the ATM network. Additionally, the system comprises a scheduler which has R different rate bins for holding sessions, where R is an integer greater than or equal to 2. The scheduler schedules service by the server among the R different rate bins, with precision P, where P is an integer and the number of bits assigned for precision. The scheduler is connected to the server.

The present invention pertains to a method for providing service by a server to sessions. The method comprises the steps of receiving a first session having a rate at a scheduler. Next there is the step of placing the first section into a rate bin of R rate bins which has a rate corresponding to the rate of the session. Then there is the step of receiving a second session having a rate at the scheduler. Next there is the step of placing the second session into the rate bin. Next there is the step of providing service by the server to the first session. Then there is the step of determining whether the first session still requires more than a predetermined amount of service from the server if the first session does require more than the predetermined amount of service from the server. Next there is the step of providing service to the first session again in the next service round that the server provides service to the rate bin.

The present invention pertains to a method for scheduling using rate bins. The entities are divided among R Rate Bins where each bin contains all entities whose rates fall between its base rate and a multiple the base rate. The base rate of successive bins is 1/<the multiple> the base rate of the previous group. Sessions are maintained within the rate bins on a singly linked list. The Rate Bins are scheduled at a rate equal to the sum of the rates of the sessions stored within the bin. To select among the Rate Bins, a scheduler such as U.S. patent application Ser. No. 08/362,217 titled "Method and a Scheduler for Controlling When a Server Provides Service to an Entity" is used. Each session maintains the fraction above the group's base rate that it should be serviced at. When a rate bin is selected, the first session on the linked list is chosen for service. When a session is serviced from the bin, a service weight for the session is incremented by the fraction it maintains. When the service weight exceeds one, the session is held at the head of the linked list for a second transmission the next time the group is serviced (when the service weight is decremented by one). When the service weight is below one, the session is sent to the end of its Rate Bin's linked list. This enables a server to support a wide range of rates with arbitrary precision while maintaining minimal information in the core scheduler.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 9:
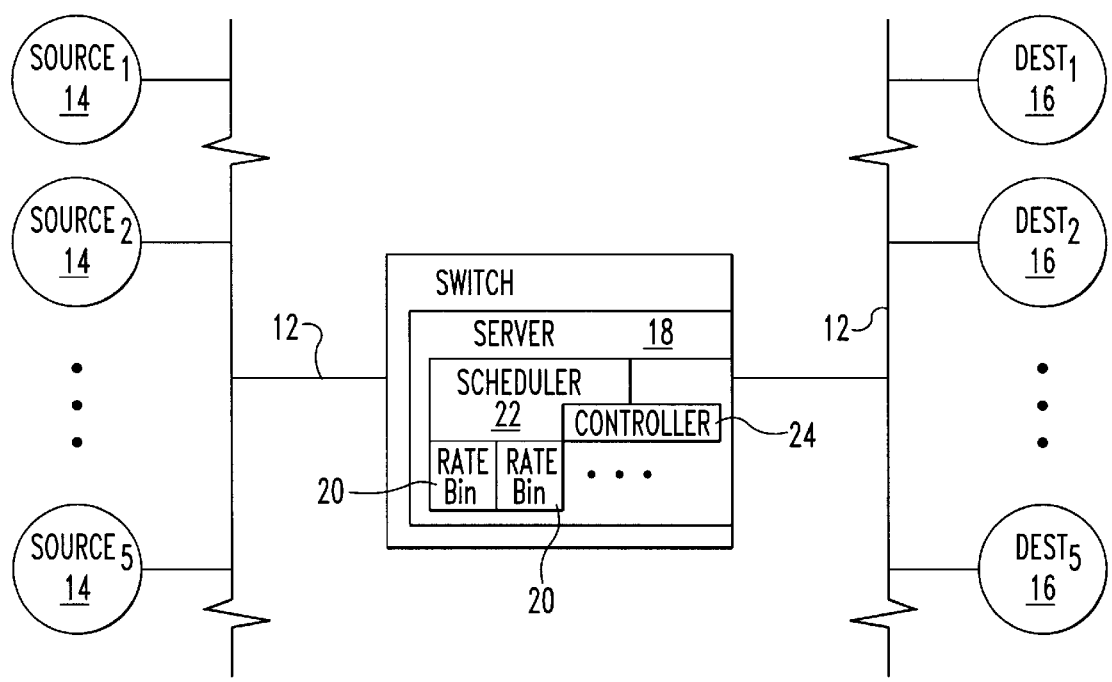
FIG. 9 is a schematic representation of a system of the present invention.

Referring now to the drawings wherein like reference numerals refer to similar or identical parts throughout the several views, and more specifically to FIG. 9 thereof, there is shown a system 10 for transmitting ATM cells. The system 10 comprises an ATM network 12 along which ATM cells are transmitted. The system 10 comprises S sources 14 where S is greater than or equal to 1 and is an integer. Each source 14 is connected to the network 12 and produces ATM cells for transmission on the network 12. The system 10 comprises D destinations 16 where D is greater than or equal to 1 and is an integer. Each destination is connected to the network 12. Each destination receives ATM cells from the network 12. The system 10 comprises a server 18 connected to the ATM network 12. Additionally, the system has a scheduler 22 which has R different rate bins 20 for holding sessions, where R is an integer greater than or equal to 2. The scheduler 22 schedules service by the server 18 among the R different rate bins 20, with precision P, where P is an integer and the number of bits assigned for precision. The scheduler 22 is connected to the server 18.

The present invention pertains to a scheduler 22 for a server 18 for serving ATM cells. The scheduler comprises R rate bins 20 where R is greater than or equal to 2. The scheduler comprises a controller 24 which places a session having a desired rate into a rate bin of the R rate bins 20.

Preferably, each rate bin holds sessions within a predetermined range of rates. Each rate bin has a different predetermined range of rates. The predetermined range of rates of each rate bin is preferably defined by a base rate and a multiple of the base rate. The base rate of the first rate bin of the R rate bins 20 has a base rate which is half a link bandwidth and each successive rate bin of the R rate bins 20 has a base rate of half the base rate of the previous bin.

The controller 24 preferably places a session having a desired rate into the rate bin of the R rate bins 20 with the highest base rate that is closest to being less than or equal to the desired rate of the session. Preferably, the sessions in each rate bin form a linked list 38. The controller 24 provides preferably the first session in the linked list 38 of the rate bin for service from the server 18 in each service round that the rate bin is designated to receive service.

Each rate bin preferably has a HOLDING FLAG 26 which indicates whether a first session of the linked list 38 is to receive service again in a next service round that the server 18 provides service to the rate bin, a HEAD SESSION 28 which indicates the first session in the linked list 38 of sessions and a TAIL SESSION 30 which indicates a last session in the linked list 38. Each session has preferably ADDITIONAL SERVICE 32 greater than or equal to 0 which indicates how much service above its base rate the session would like to receive from the server 18 every service round the server 18 provides service to the session, a SERVICE LAG 34 which indicates the amount of service from the server 18 for which the session is still waiting after having received service from the server 18, a NEXT SESSION 35 which indicates the next session in the linked list 38 to receive service from the server 18, and a rate bin that indicates in which rate bin the session is disposed.

The controller 24 preferably adds the ADDITIONAL SERVICE 32 of a session to the sessions SERVICE LAG 34 after the session receives service from a server 18 and causes the session to receive service again from the server 18 in the next service round as long as the SERVICE LAG 34 of the session is greater than or equal to the predetermined value and than the controller 24 moves the session to the end of the linked list 38 of the rate bin and moves each of the other sessions of the linked list 38 up in order to receive service from the server 18. Preferably, the predetermined value=1. Preferably, the ADDITIONAL SERVICE 32 and the SERVICE LAG 34 are measured in forms of fractional cells per service round. Preferably, a session includes a connection.

The present invention pertains to a method for providing service by a server 18 to sessions. The method comprises the steps of receiving a first session having a rate at a scheduler 22. Next there is the step of placing the first section into a rate bin of R rate bins 20 which has a rate corresponding to the rate of the session. Then there is the step of receiving a second session having a rate at the scheduler 22. Next there is the step of placing the second session into the rate bin. Next there is the step of providing service by the server 18 to the first session. Then there is the step of determining whether the first session still requires more than a predetermined amount of service from the server 18 if the first session does require more than the predetermined amount of service from the server 18. Next there is the step of providing service to the first session again in the next service round that the server 18 provides service to the rate bin.

Preferably, after the determining step, there is the step of providing service to the second session with the server 18 if the first session requires less than a predetermined amount of service from the server 18. Preferably, the placing the second session step includes the step of forming a linked list 38 with the first session and second session. After the step of providing service by the server 18 to the first session, there is preferably the step of adding ADDITIONAL SERVICE 32 to be provided to the first session to a SERVICE LAG 34 of the first session to determine the amount of service the session would like to receive from the server 18.

The present invention introduces an alternative design of a session scheduler that does not exhibit the problems of the prior art schedulers disclosed in the previous section. The scheduler of the present invention uses rate bins 20 that hold all sessions having a rate between its base rate and a small multiple of this weight. A preferred embodiment of the invention uses rate bins 20 with successive bins having a base rate of ½ that of the previous rate bin. The first rate bin having a rate of ½ of the link bandwidth, and the number of R rate bins 20 determines the slowest supportable rate. Each session will be placed into the rate bin with the highest base rate that is greater or equal to the desired rate of the session.

For R groups, this enables a span of rates from:

$$MaxRate \geq r \geq \frac{MaxRate}{2^R} \text{ to be represented.}$$

Alternatively, the number of Rate bins 20 that would be required may be found from:

$$R = \log_2 \frac{MaxRate}{MinRate} (MaxRate \text{ may equal the link rate if desired.})$$

Sessions are maintained within the rate bins 20 on a singly linked list 38. If a session c requests a rate $r_c$ which is faster than the rate bin's base rate $r_b$, this additional service for session c $AS_c$ will be recorded as a fraction of the base rate by:

$$AS_c = 2_x^p \left( \frac{(r_c - r_b)}{r_b} \right)$$

Where p is the number of bits used for precision.

Figure 1:
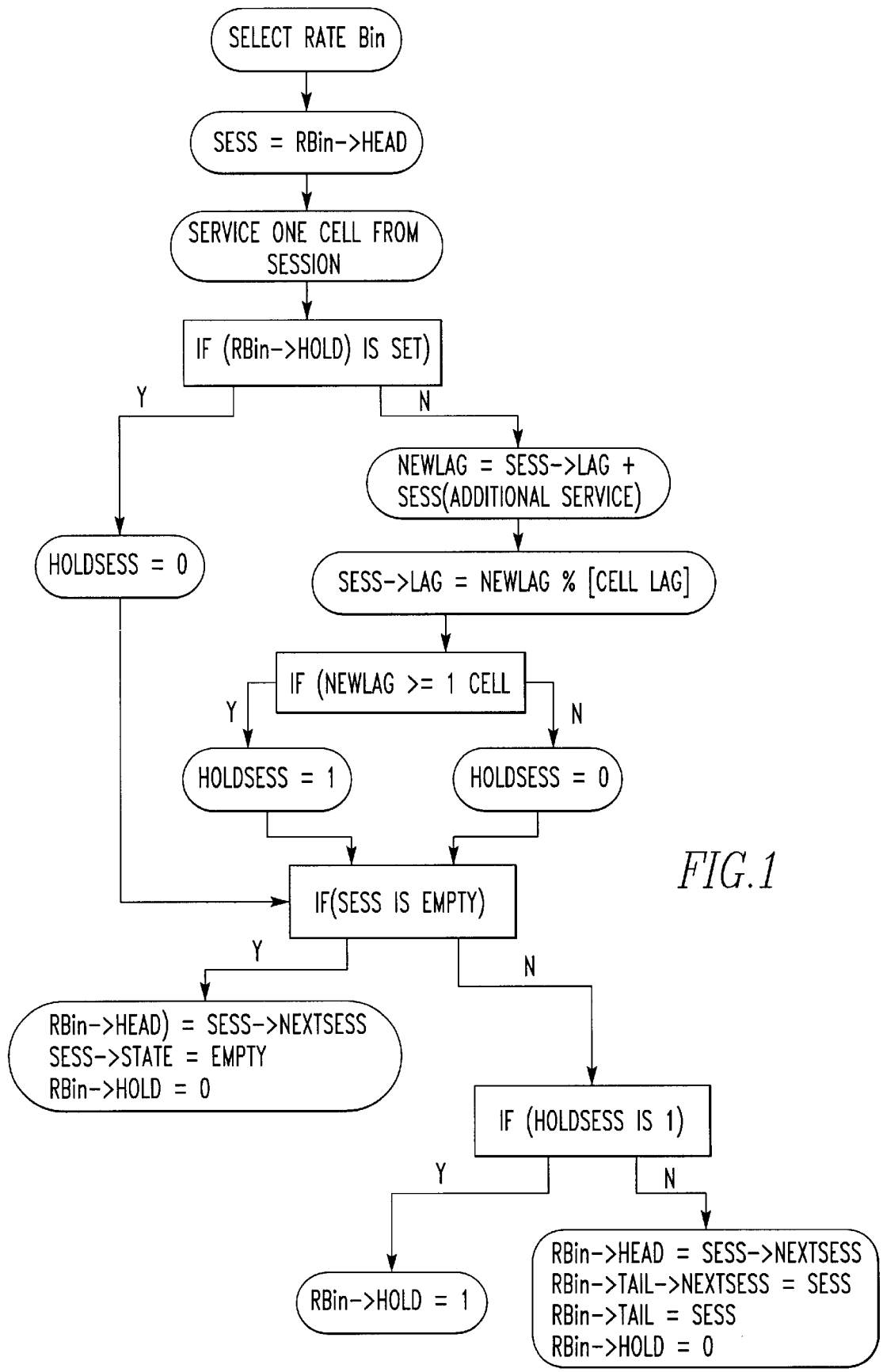
FIG. 1 is a flow chart of the operation of the present invention.
Figure 2:
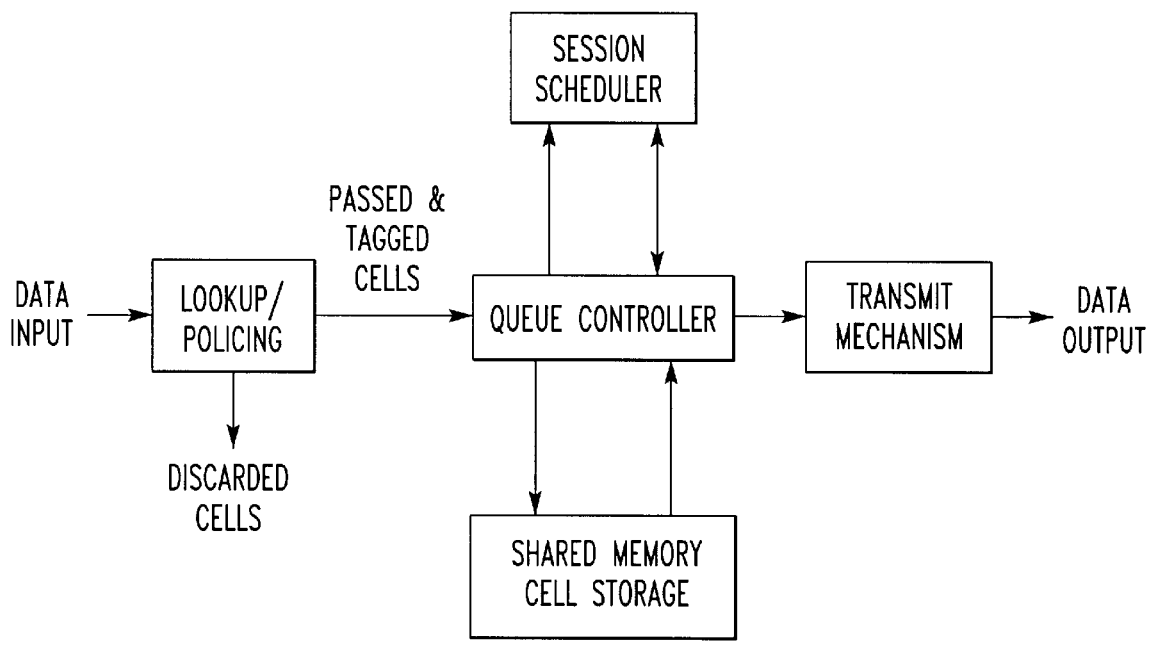
FIG. 2 is a block diagram of circuit servicing multiple sessions.
Figure 3:
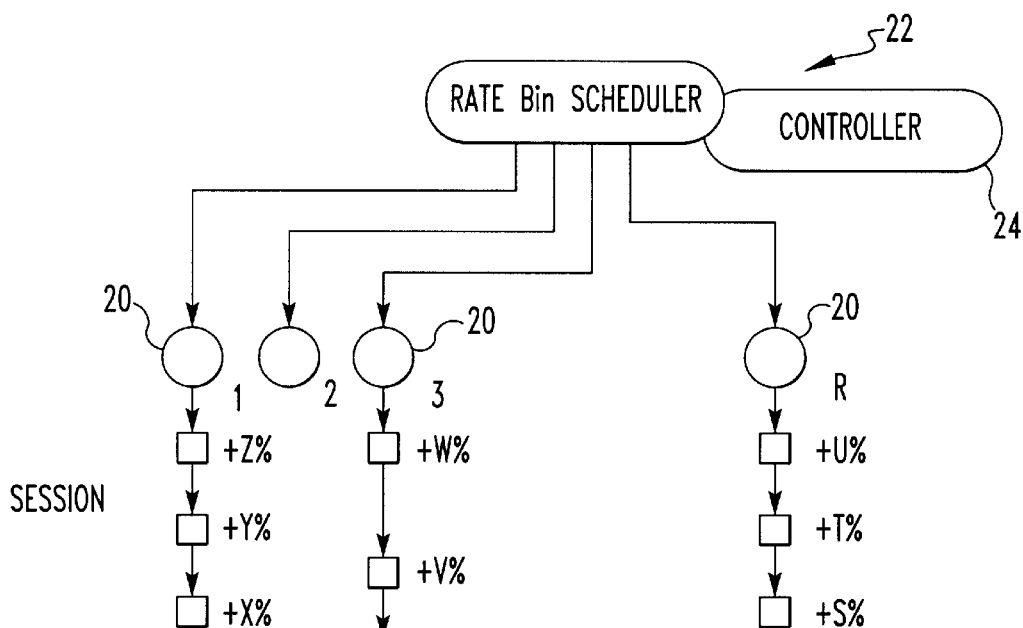
FIG. 3 is a logical representation of the scheduler.

Each Rate Bin i is scheduled at a rate equal to the sum of the rates of the sessions that are assigned to the bin:

$$R_i = \sum_{j=0}^{n_i - 1} r_{ij}$$

wherein
$n_i$=number of sessions in the ith Rate Bin
$r_{ij}$=rate of the jth session in the ith Rate Bin The Rate bins 20 are scheduled at a rate equal to the sum of the rates of the sessions stored within the bin. To select among the Rate bins 20, a scheduler such as U.S. patent application Ser. No. 08/362,217 titled "Method and a Scheduler for Controlling When a Server Provides Service to an Entity", incorporated by reference herein, is used. When a rate bin is selected, the first session on the linked list 38 is chosen for service. When a session is serviced from the bin, a SL (SERVICE LAG) 34 for the session is incremented by the AS fraction it maintains. When the SERVICE LAG 34 exceeds one cell, the session is held at the head of the linked list 38 for a second transmission the next time the group is serviced (when the SERVICE LAG 34 is decremented by one). When the service weight is below one, the session is sent to the end of its Rate Bin's linked list 38. A flow chart description is shown in FIG. 1.

By restricting the range of rates within the Rate bins 20 to a factor of two and maintaining the AS fraction desired per session, the only session that can obtain a SERVICE LAG 34 in excess of 1 cell is the one at the head of the Rate Bin's list. This enables the SL to be maintained only with a fraction at is the same size as the AS field. Because these fields which delineate the precision within a group are maintained in session tables and not with additional Rate bins 20, the scheduler is able to support a wide range of rates with arbitrary precision while maintaining minimal information in the core scheduler.

This mechanism transforms the problem of scheduling N sessions of potentially N different rates to scheduling among R different Rate Bis, with precision P. Each session must allocate
PM=log$_2$MaxConns+2P+log$_2$R bits of memory for scheduling purposes.

The number of R Rate bins 20 and memory required can be illustrated by example. Consider the case of an OC-48 ATM Link, which transmits cells at approximately 5,651, 300 cells per second. To be able to represent any rate from the full link capacity of 2.4 Gbps down to 40 Kbps, 16 groups are required. For a switch to represent this range of rates with 0.5% precision within the Rate bins 20 among 64 thousand sessions, we note the following:

One half of one percent precision within the groups is made possible with an assignment of P=8 bits.

Thus, PM=16+2(8)+log$_2$16=36 bits of memory is required per session. Rounding to 5Bytes per session, only 320 KBytes of Data would be required for all sessions.

Note that no precision is lost in the highest bin by starting at ½ of link rate, because at most 2 sessions may be present (at ½ each) or 1 will be present, which will be scheduled by the scheduler selecting among the bins.

Figure 4:
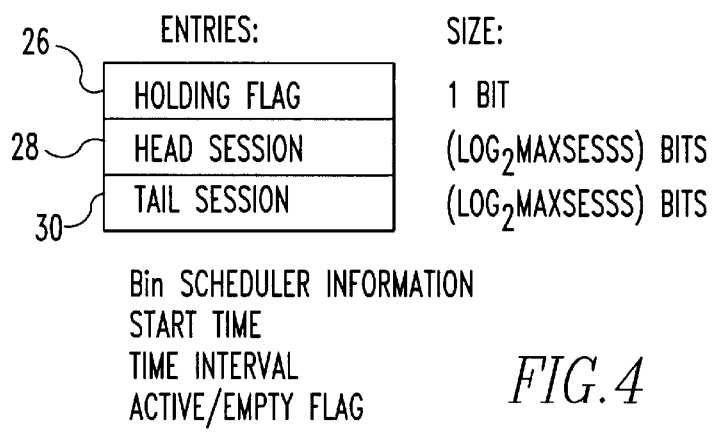
FIG. 4 details rate bin scheduling information.

FIG. 4 shows the information that is retained in the scheduler for each rate bin.

Figure 5:
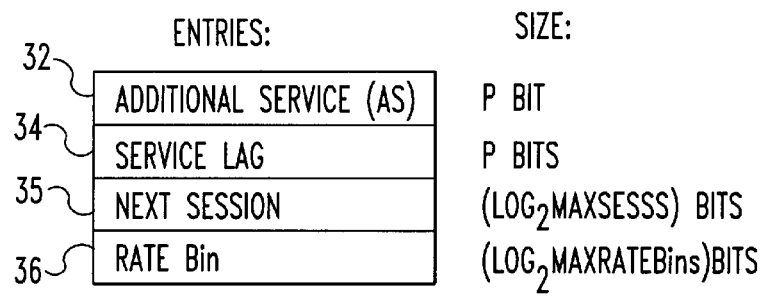
FIG. 5 details session scheduling information.

"HEAD SESSION" and
"TAIL SESSION" denote the first and last sessions on the linked list 38 of the rate bin.
"HOLDING FLAG 26" is set when the session at the head session is being held for a second service opportunity.
FIG. 5 shows the information that is retained for each session entry.
"Rate Bin" identifies the rate bin the session desires to be serviced within.
"Next Session" denotes the next session within the rate bin in which the given session is being serviced.
"ADDITIONAL SERVICE 32 (AS)" denotes the amount of service above the base rate of the rate bin which the session desires service. (this is a fraction of $2^P$).
"SERVICE LAG 34" denotes the fraction of a cell the session has fallen behind in service.

An illustration of the mechanism in operation is as follows using 6 bits for the precision of the Lags and Additional Service (AS). Assume sufficient cells are in the queue (or arrive during service) to keep a backlog of cells on sessions A through D.

Figure 6:
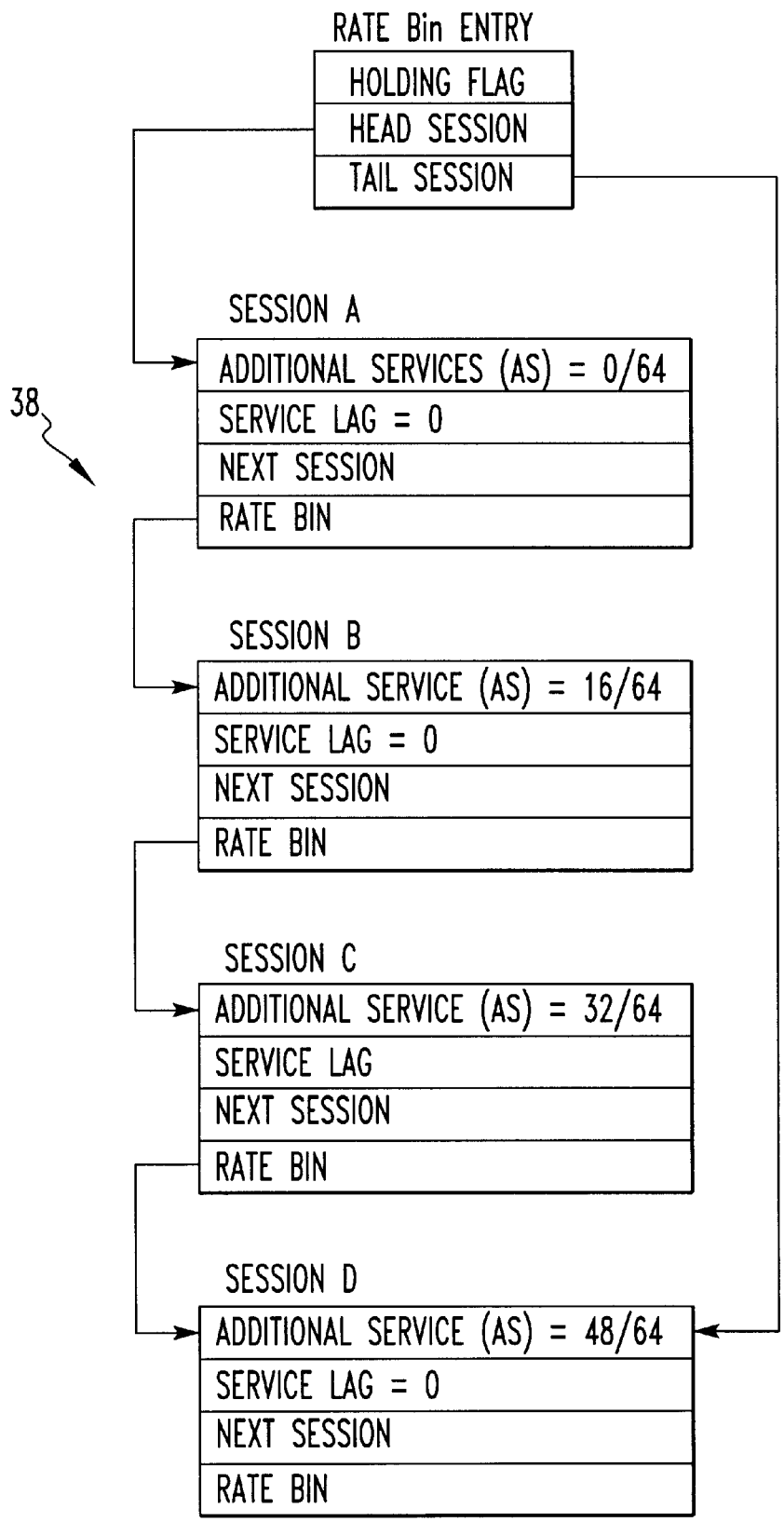
FIG. 6 is a schematic representation of the System of the present invention.
Figure 7:
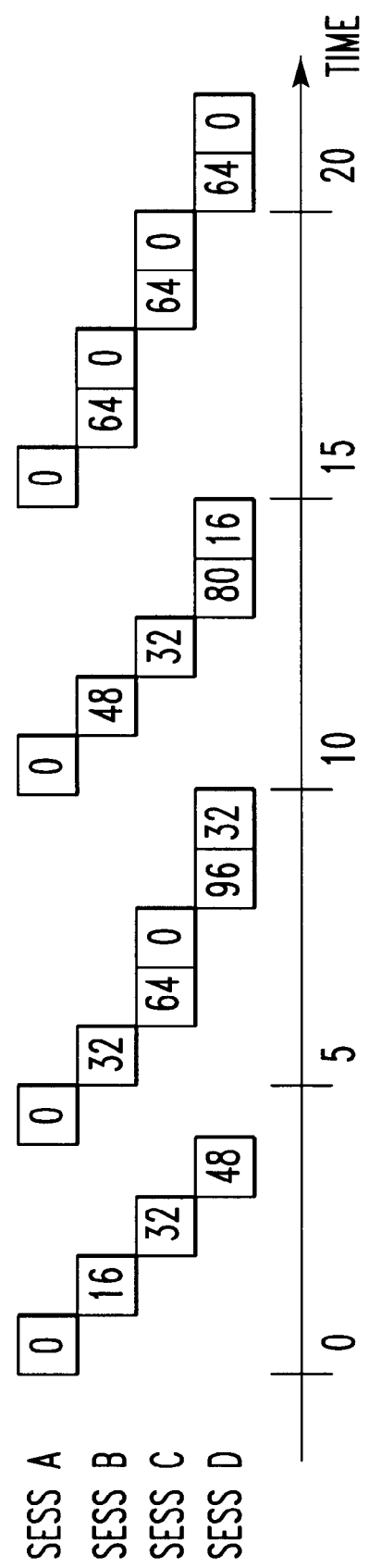
FIG. 7 shows scheduling within a Rate Bin.

The lags are updated when the session is serviced, as shown in FIG. 1. The system starts at time 0 with all lags set to zero as shown in FIG. 6. FIG. 7 shows the order in which cells will be sent for 22 cell times. Cell transmissions are denoted by a box at the cell time. The number within the boxes denote the total accumulated service lag remaining after the cell has been sent. A Lag greater or equal to 64 is shown to reflect the state before the remainder is removed. This condition only exists when a cell is to be held for service on the second round.

FIG. 6 simply shows the state of one of the rate bins 20. Assume that all sessions have a sufficient number of cells stored in a queuing mechanism, such as [J. C. R. Bennett and R. Brownhill. "Multicast Shared Memory" U.S. Pat. No. 5,528,588], incorporated by reference.

Figure 8:
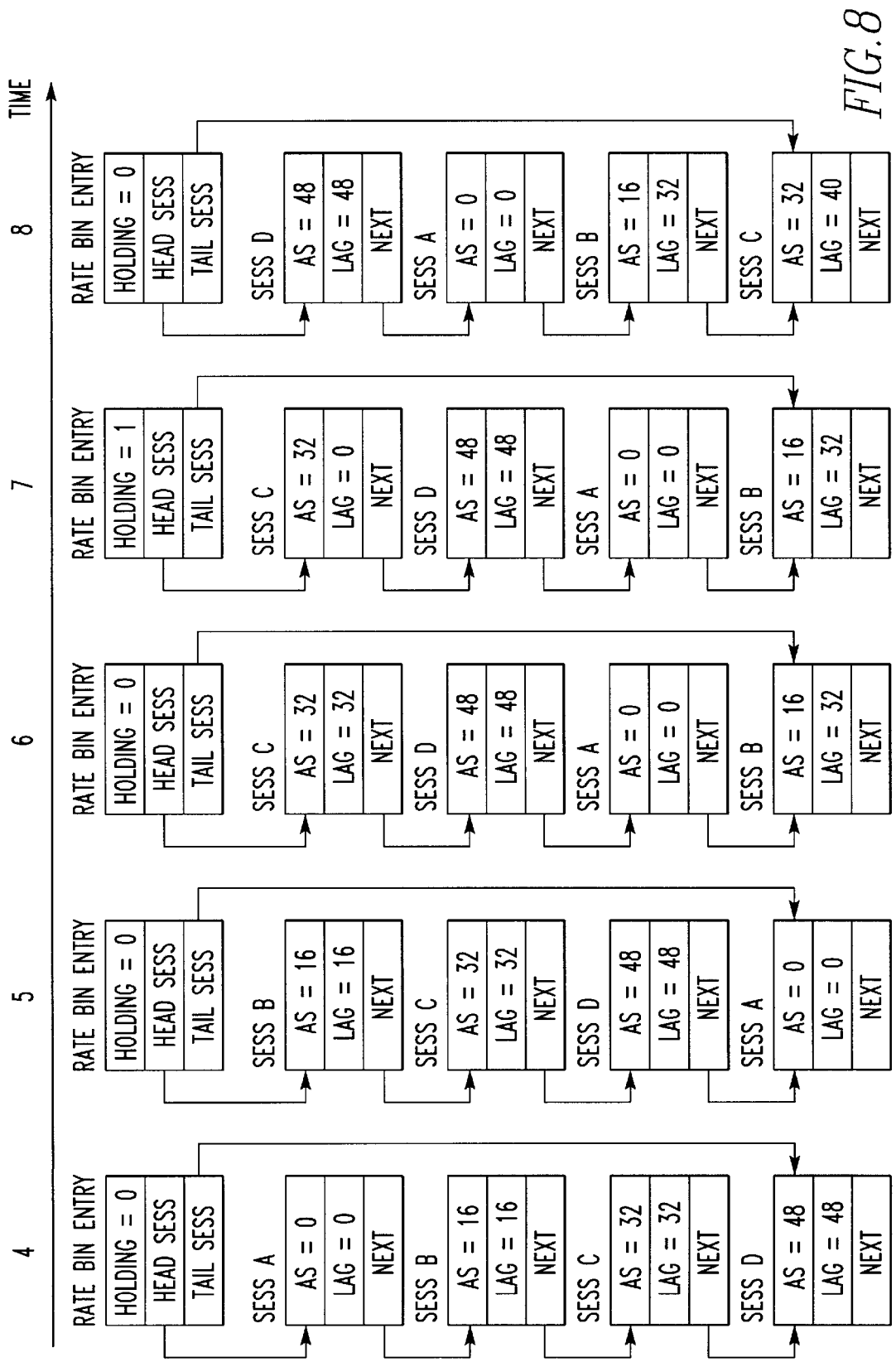
FIG. 8 shows an example of a linked list in a rate bin.

In regard to FIG. 7, all System 10 Lags are a mod 64 fraction, as are the ADDITIONAL SERVICE 32 (AS). The lags are updated when the session is serviced. Time starts at cell time 0. Focusing on cell time 4 to 8, the system 10 state changes as follows:

By observing the state of the session list at the beginnings of time 4 to 8, FIG. 8 is obtained. Note that Session A is the first session on the list at the beginning of time 4. It desires service at the base rate of the group, thus its AS is zero. When it is serviced, its AS (zero) is added to its accumulated lag (also zero) resulting with zero. Zero is less than 64, thus the session is not being held for retransmission, thus is sent to the tail of the scheduler list for this bin. This brings us to time 5.

Session B is the first session on the list at the beginning of time 5. It desires service that is 25% faster than the base rate of the group, thus its AS is 0.25*64=16. When it is serviced, its AS (16) is added to its accumulated lag (also 16) resulting in 32. Thirty-two is less than 64, thus the session is not being held for retransmission, thus is sent to the tail of the scheduler list for this bin. This brings us to time 6.

Session C is the first session on the list at the beginning of time 6. It desires service that is 50% faster than the base rate of the group, thus its AS is 0.50*64=32. When it is serviced, its AS (32) is added to its accumulated lag (also 32) resulting in 64. This rolls over into the 7th bit which denotes that the session has fallen behind by 1 cell for the number of rounds that have been serviced. Since additional cells remain in the session's queue, it is held for retransmission. The result of 64% 64 is zero, thus is the lag stored for the session. This brings us to time 8.

Session D is the first session on the list at the beginning of time 6. It desires service that is 75% faster than the base rate of the group, thus its AS is 0.75*64=48. When it is serviced, its AS (48) is added to its accumulated lag (also 48) resulting in 96. This rolls over into the 7th bit which denotes that the session has fallen behind by 1 cell for the number of rounds that have been serviced. Since additional cells remain in the session's queue, it is held for retransmission. The result of 96% 64 is 32, thus is the lag stored for the session. This brings us to time 8.

With the group serviced at (1+1.25+1.5+1.75=5.5) times the base rate of the group, four rounds should take 22 units of time. As can be seen in 22 cell times, the sessions are serviced 4, 5, 6, 7 times. This corresponds to their desired service shares. As can be seen, the service is generally smooth.

When multiple Rate Bins have sessions with cells enqueued, the Rate Bin Scheduler will interleave the service between them while the previously described mechanism will divide service among the sessions. The example above would have "time" replaced with "Rate Bin Service Time", i.e. to denote the number of times the rate bin is serviced.

As can be seen, the service is generally smooth. When multiple Rate bins 20 have sessions with cells enqueued, the Rate Bin Scheduler will interleave the service between them while the previously described mechanism will divide service among the sessions.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A scheduler for a server for serving ATM cells comprising:
   R rate bins where R is greater than or equal to 2 and a base rate, each rate bin holds sessions within a predetermined range of rates, each rate bin having a different predetermined range of rates, the base rate of the first rate bin of the R rate bins has a base rate which is half the link bandwidth and each successive rate bin of the R rate bins has a base rate of half the base rate of the previous bin; and
   a controller which places a session having a desired rate into a rate bin of the R rate bins with the highest base rate that is closest to being less than or equal to the desired rate of the session.

2. A scheduler as described in claim 1 wherein the predetermined range of rates of said each rate bin is defined by a base rate and a multiple of the base rate.

3. A scheduler as described in claim 2 wherein the sessions in said each rate bin form a linked list.

4. A scheduler as described in claim 1 wherein each rate bin has a HOLDING FLAG which indicates whether a first session of the linked list is to receive service again in a next cycle that the server provides service to the rate bin, a HEAD SESSION which indicates the first session in the linked list of sessions and a TAIL SESSION which indicates a last session in the linked list.

5. A scheduler as described in claim 4 wherein each session has ADDITIONAL SERVICE greater than or equal to 0 which indicates how much service above its base rate the session would like to receive from the server every service round the server provides service to the session, a SERVICE LAG which indicates the amount of service from the server for which the session is still waiting after having received service from the server, a NEXT SESSION which indicates the next session in the linked list to receive service from the server, and a RATE BIN that indicates in which rate bin the session is disposed.

6. A scheduler as described in claim 5 wherein the controller provides the first session in the linked list of the rate bin for service from the server in each service round that the rate bin is designated to receive service.

7. A scheduler as described in claim 6 wherein the controller adds the ADDITIONAL SERVICE of a session to the session's SERVICE LAG after the session receives service from a server and causes the session to receive service again from the server in the next service round as long as the SERVICE LAG of the session is greater than or equal to a predetermined value, and then the controller moves the session to the end of the linked list of the rate bin and moves each of the other sessions of the linked list up in order to receive service from the server.

8. A scheduler as described in claim 7 wherein the predetermined value equals 1.

9. A scheduler as described in claim 8 wherein the ADDITIONAL SERVICE and the SERVICE LAG are measured in forms of fractional cells per service round.

10. A scheduler as described in claim 9 wherein a session includes a connection.

11. A system for transmitting ATM cells comprising:

an ATM network along which ATM cells are transmitted;

S sources where $S \geq 1$ and is an integer, each source connected to the network and produces ATM cells for transmission on the network;

D destinations where $D \geq 1$ and is an integer, each destination connected to the network and produces ATM cells for transmission on the network, each destination receiving ATM cells from the network;

a server connected to the ATM network; and a scheduler having R different rate bins for holding sessions, where R is an integer greater than or equal to 2, said scheduler for scheduling service by the server among the R different rate bins, with precision P, where P is an integer and the number of bits assigned for precision, said scheduler connected to said server, each rate bin holds sessions within a predetermined range of rates, each rate bin having a different predetermined range of rates.

12. A method for providing service by a server to sessions comprising the steps of:

receiving a first session having a rate at a scheduler;

placing the first session into a rate bin of R rate bins which has a rate corresponding to the rate of the session;

receiving a second session having a rate at the scheduler;

placing the second session into the rate bin;

providing service by the server to the first session;

determining whether the first session still requires more than a predetermined amount of service from the server if the first session does require more than the predetermined amount of service from the server;

providing service to the first session again in the next service round that the server provides service to the rate bin; and providing service to the second session with the server if the first session requires less than a predetermined amount of service from the server.

13. A method as described in claim 12 wherein the placing the second session step includes the step of forming a linked list with the first session and second session.

14. A method as described in claim 13 including after the step of providing service by the server to the first session, there is the step of adding additional service to be provided to the first session to a service lag of the first session to determine the amount of service the session would like to receive from the server.

15. A scheduler for a server for serving ATM cells comprising:

R rate bins where R is greater than or equal to 2, each rate bin holds sessions within a predetermined range of rates, each rate bin having a different predetermined range of rates, the sessions in each rate bin form a linked list, each rate bin has a HOLDING FLAG which indicates whether a first session of the linked list is to receive service again in a next cycle that the server provides service to the rate bin, a HEAD SESSION which indicates the first session in the linked list of sessions and a TAIL SESSION which indicates a last session in the linked list; and a controller which places a session having a desired rate into a corresponding rate bin of the R rate bins.

16. A scheduler as described in claim 15 wherein the predetermined range of rates of each rate bin is defined by a base rate, and a multiple of the base rate.

* * * * *